United States Patent
Chang

(10) Patent No.: US 8,270,686 B2
(45) Date of Patent: Sep. 18, 2012

(54) FINGERPRINT IDENTIFICATION APPARATUS AND PORTABLE ELECTRONIC DEVICE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1281 days.

(21) Appl. No.: 11/960,650

(22) Filed: Dec. 19, 2007

(65) Prior Publication Data
US 2008/0247613 A1 Oct. 9, 2008

(30) Foreign Application Priority Data
Apr. 4, 2007 (CN) .......................... 2007 1 0200384

(51) Int. Cl.
*G06K 9/00* (2006.01)
(52) U.S. Cl. ........................................ 382/126; 382/127
(58) Field of Classification Search .................. None
See application file for complete search history.

(56) References Cited

U.S. PATENT DOCUMENTS

| 7,231,070 B2 | 6/2007 | Bjorn et al. |
| 2002/0083329 A1 | 6/2002 | Kiyomoto |
| 2002/0110266 A1* | 8/2002 | Teng et al. ..................... 382/127 |
| 2003/0128867 A1 | 7/2003 | Bennett |
| 2004/0208347 A1* | 10/2004 | Baharav et al. ............... 382/124 |

FOREIGN PATENT DOCUMENTS
TW 200610361 3/2006
* cited by examiner

*Primary Examiner* — Brian P Werner
*Assistant Examiner* — Elisa Rice
(74) *Attorney, Agent, or Firm* — Altis Law Group, Inc.

(57) ABSTRACT

A fingerprint identification apparatus includes at least three light sources, a light guide, a camera module and a processor. The light guide has a top and a bottom surfaces and at least three side surfaces. The top surface serves as a fingerprint contacting surface, each of the side surfaces has a first curved portion, the bottom surface has a second curved portion. Each of the first curved portions is opposite to the respective light sources and configured for converging the light beams emitted from thereof onto the top surface for illuminating a fingerprint thereon. The camera module aligns and cooperates with the second curved portion for capturing and converting an optical image of the fingerprint into electronic image associated with the fingerprint. The processor is configured for receiving and comparing the electronic image associated with the fingerprint with pre-stored electronic images of fingerprints to verify the fingerprint.

11 Claims, 6 Drawing Sheets

FINGERPRINT IDENTIFICATION APPARATUS AND PORTABLE ELECTRONIC DEVICE HAVING SAME

BACKGROUND

1. Technical Field

The present invention relates to fingerprint identification, and particularly, to a fingerprint identification apparatus for a portable electronic device.

2. Description of Related Art

In information technology, biometrics has become one of the fastest developing technologies for authentication. The most typical and promising biometrics is fingerprint. Fingerprint identification apparatuses have been widely used in attendance machines, door locks and safe boxes. With the rapid development of electronics technology, fingerprint identification apparatuses also have been proposed for application in various portable electronic devices such as personal computers, mobile phones and personal digital assistants.

Capturing of fingerprint images is one of the key techniques of fingerprint identification. Most fingerprint identification apparatuses use a camera module for capturing a fingerprint image of a user. However, this technique is not reliable because it may depend on factors such as lighting and humidity. For example, the light may be too bright or not bright enough for capturing the desired image.

What is needed, therefore, is a reliable fingerprint identification apparatus which uses light sources more efficiently and a portable electronic device having the fingerprint identification apparatus.

SUMMARY

In a present embodiment, an exemplary fingerprint identification apparatus includes at least three light sources for emitting light beams, a light guide, a camera module and a processor. The light guide has a top surface, a bottom surface and at least three side surfaces interconnected between the top surface and the bottom surface. The top surface serves as a fingerprint contacting surface, each of the at least three side surfaces has a first curved portion provided thereon, the bottom surface has a second curved portion provided thereon. Each of the first curved portions, on the respective at least three side surfaces, is opposite to the respective at least three light sources and configured for converging the light beams emitted from the respective at least three light sources onto the top surface for illuminating a fingerprint placed on the top surface. The camera module is in alignment with the second curved portion on the bottom surface of the light guide and configured for capturing and converting an optical image of the fingerprint into an electronic image associated with the fingerprint. The processor is configured for receiving and comparing the electronic image associated with the fingerprint with pre-stored electronic images of fingerprints in order to verify the fingerprint.

In another present embodiment, an exemplary portable electronic device comprises a main body and a cover rotatable relative to the main body, the main body has a front surface and an opposite back surface, the front surface of the main body has a keyboard and a screen thereon, the cover is defined on the back surface of the light guide. A camera module and a processor are received in the main body and the camera module faces to the back surface of the main body. At least three light sources and a light guide are received in the cover.

Other advantages and novel features of the present invention will become more apparent from the following detailed description of preferred embodiment when taken in conjunction with the accompanying drawings.

BRIEF DESCRIPTION OF THE DRAWINGS

Many aspects of the fingerprint identification apparatus and portable electronic device can be better understood with reference to the following drawings. The components in the drawing are not necessarily drawn to scale, the emphasis instead being placed upon clearly illustrating the principles of the present fingerprint identification apparatus and portable electronic device. Moreover, in the drawings, like reference numerals designate corresponding parts throughout the several views.

DETAILED DESCRIPTION OF THE PREFERRED EMBODIMENTS

Embodiments of the present fingerprint identification apparatus and portable electronic device will now be described in detail below and with reference to the drawings.

Figure 1:
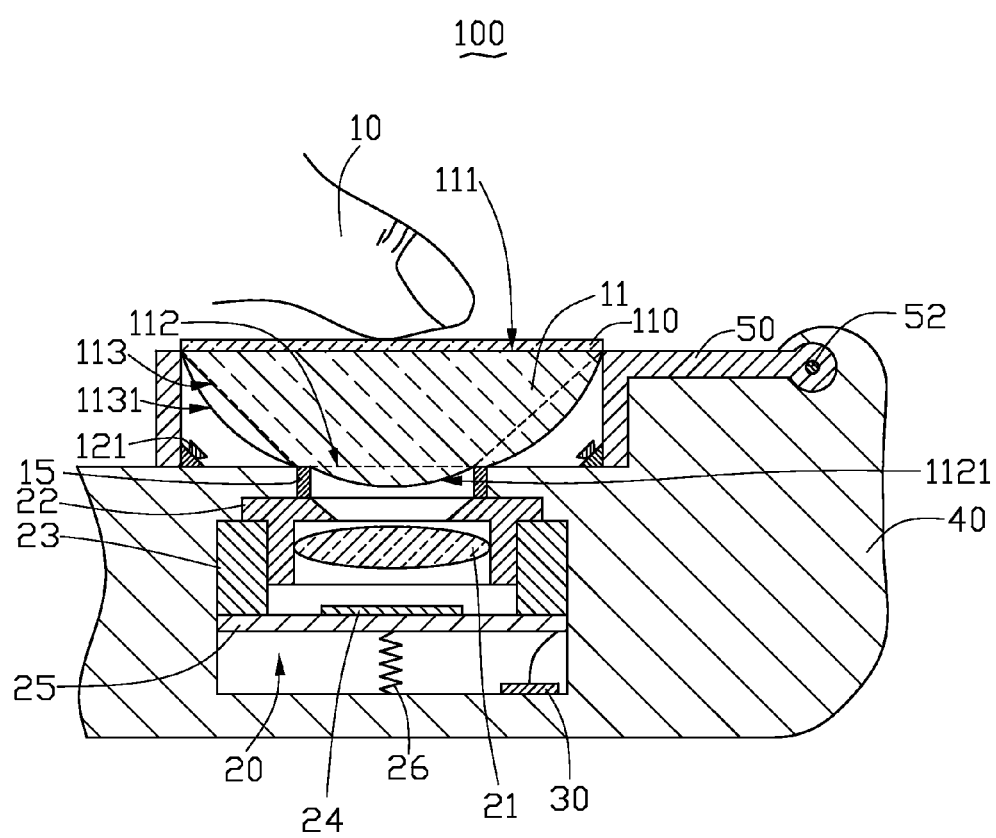
FIG. 1 is a partially cut-away view of a fingerprint identification apparatus according to a first embodiment of the present invention.
Figure 2:
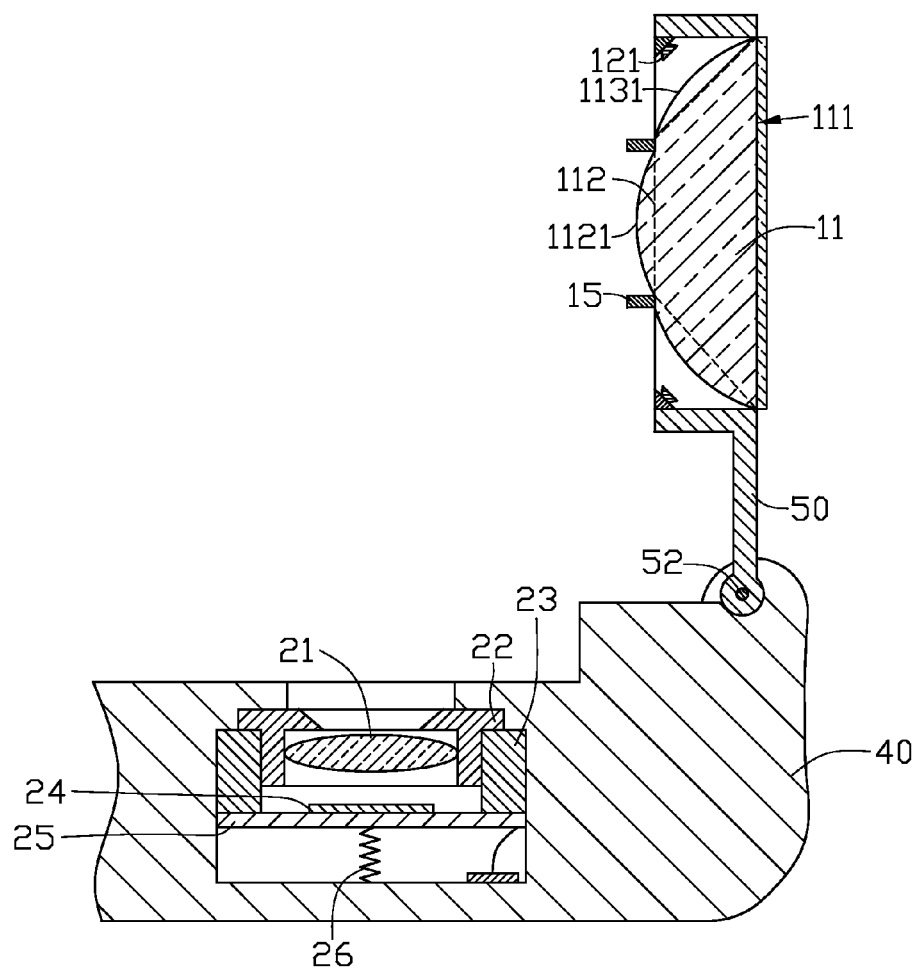
FIG. 2 is a partially cut-away view of the cover at an opening state relative to the main body shown in FIG. 1.
Figure 3:
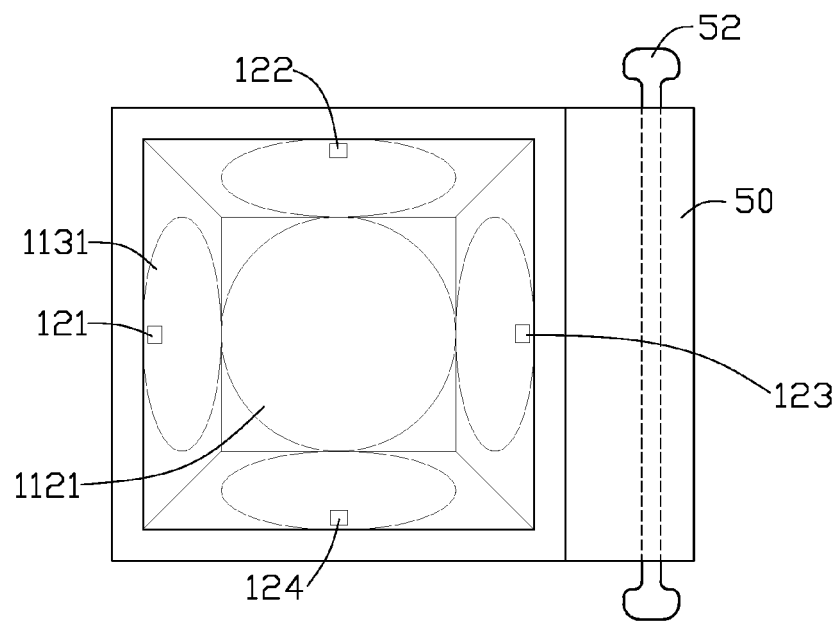
FIG. 3 is schematic plan view of the fingerprint identification apparatus shown in FIG. 1.

Referring to FIGS. 1 to 3, an exemplary fingerprint identification apparatus 100 according to a first embodiment is shown. The fingerprint identification apparatus 100 includes a main body 40, a cover 50, a light guide 11 in a frustum of a quadrangular pyramid shape, four light sources 121, 122, 123, 124, a camera module 20 and a processor 30.

The cover 50 is rotatablely mounted on the main body 40 by the shaft 52. The light guide 11 and the four light sources 121,122,123,124 are received in the cover 50. The camera module 20 and the processor 30 are received in the main body 40.

The light guide 11 can be made of a polymethyl methacrylate material or a polycarbonate material. The light guide 11 has a top surface 111, a bottom surface 112 and four side surfaces 113. The top surface 111 is larger than the bottom surface 113. The top surface 111 serves as a fingerprint contacting surface and has a transparent anti-fingerprint coating 110 thereon. Each of the four side surfaces 113 has a first curved portion 1131 provided thereon. Each of the first curved portions 1131 has an aspherical surface. The bottom surface 112 has a second curved portion 1121 provided thereon, and the second curved portion 1121 has an aspherical surface.

Each of the four light sources 121, 122, 123, 124 may be a LED. The four light sources 121, 122, 123, 124 comprise at least one red, one green and one blue light source. For example, the light source 121 is a red light source, the light source 122 is a green light source, the light source 123 is blue light source, and the light source 124 is a white light source. Each of the four light sources 121, 122, 123, 124 is opposite to the respective first curved portions 1131 on the side surfaces 113 of the light guide 11. Light beams radiately emitted from the respective light sources 121, 122, 123, 124 are converged into parallel light beams by the respective first curved portions 1131 onto the top surface 111 of the light guide 11 for illuminating a fingerprint 10 placed on the top surface 111. The fingerprint 10 is fully illuminated by the light beams from the four side surfaces 113 of the light guide 11.

The camera module 20 includes at least one lens 21, a lens-barrel 22, a barrel-holder 23, an image sensor 24, and a flexible printed circuit board 25. The camera module 20 is in alignment with the second curved portion 1121 on the bottom surface 112 of the light guide 11. Two spacers 15 can be applied between the bottom surface 112 of the light guide 111 and the lens-barrel 22. The image sensor 24 can be a CCD or a CMOS and is mounted on the flexible printed circuit board 25. The flexible printed circuit board 25 is supported by an elastic member 26 that is attached to the main body 40. The flexible printed circuit board 25 is connected to the processor 30.

The at least one lens 21 cooperates with the second curved portion 1121 on the bottom surface 112 of the light guide 11 for capturing an optical image of the fingerprint 10. The image sensor 24 detects and converts the optical image of the fingerprint 10 into an electronic image signal associated with the fingerprint 10. The image sensor 24 is more sensitive to red, green and blue light than light of other colors, therefore, a high resolution of the fingerprint 10 can be obtained under the application of the red light source, the green light source and the blue light source. The processor 30 is configured for receiving and matching the electronic image signal associated with the fingerprint 10 with pre-saved fingerprint templates therein, thereby recognizing the fingerprint 10.

When the cover 50 is opened relative to the main body 40, as shown in FIG. 2, the camera module 20 can take image from outside.

Figure 4:
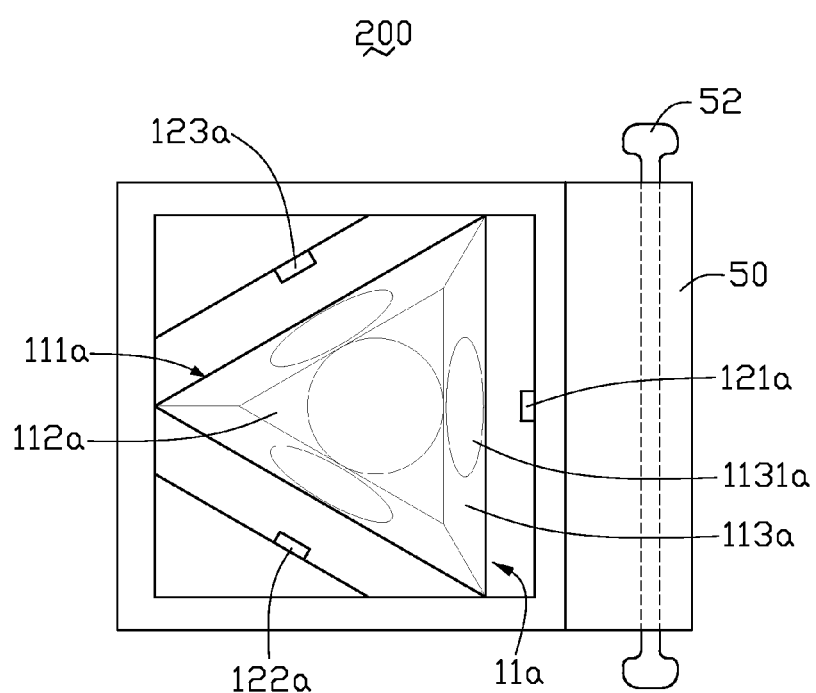
FIG. 4 is a schematic plan view of a fingerprint identification apparatus according to a second embodiment of the present invention.

FIG. 4 is a plan view of a fingerprint identification apparatus 200 according to a second embodiment. The fingerprint identification apparatus 200 is essentially similar to the fingerprint identification apparatus 100 illustrated above, however, the fingerprint identification apparatus 200 includes a light guide 11a in a frustum of a triangular pyramid shape, a red light source 121a, a green light source 122a, and a blue light source 123a. The light guide 11a includes a top surface 111a, a bottom surface 112a and three side surfaces 113a. Each of the side surfaces 113a has a first curved portion 1131a provided thereon, the bottom surface 112a has a second curved portion 112a provided thereon. Each of the light sources 121a, 122a, 123a is opposite to the respective first curved portions 1131a.

Figure 5:
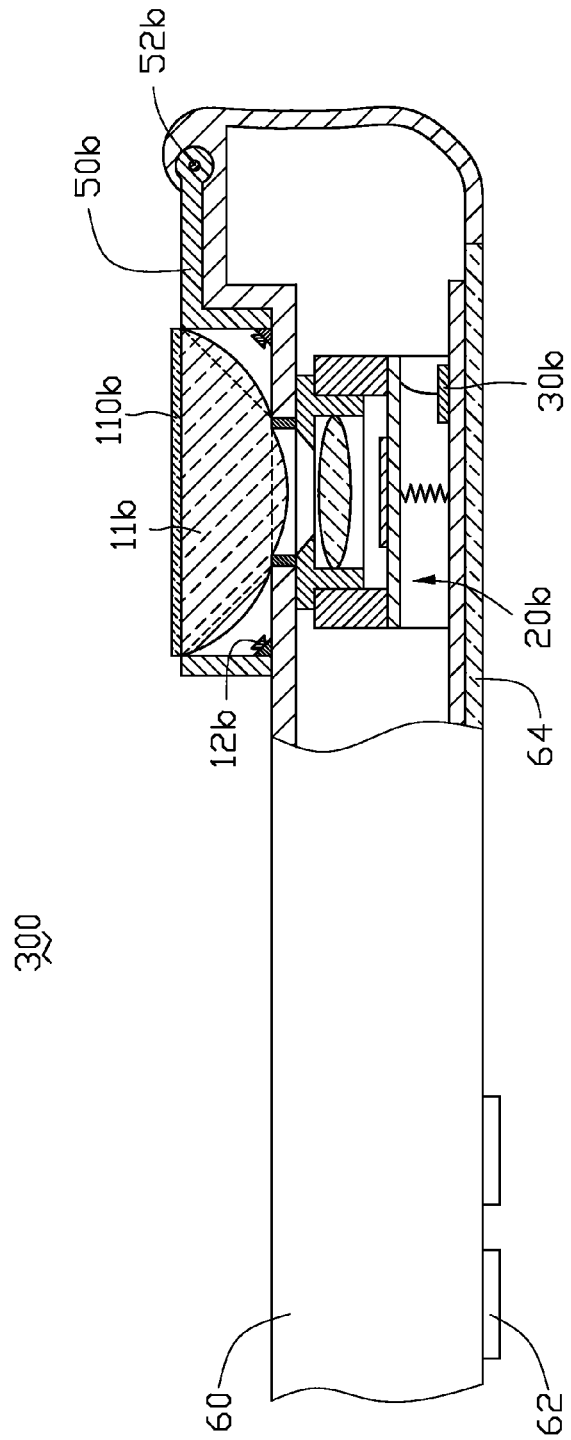
FIG. 5 is a partially cut-away view of a portable electronic device according to a third embodiment of the present invention.
Figure 6:
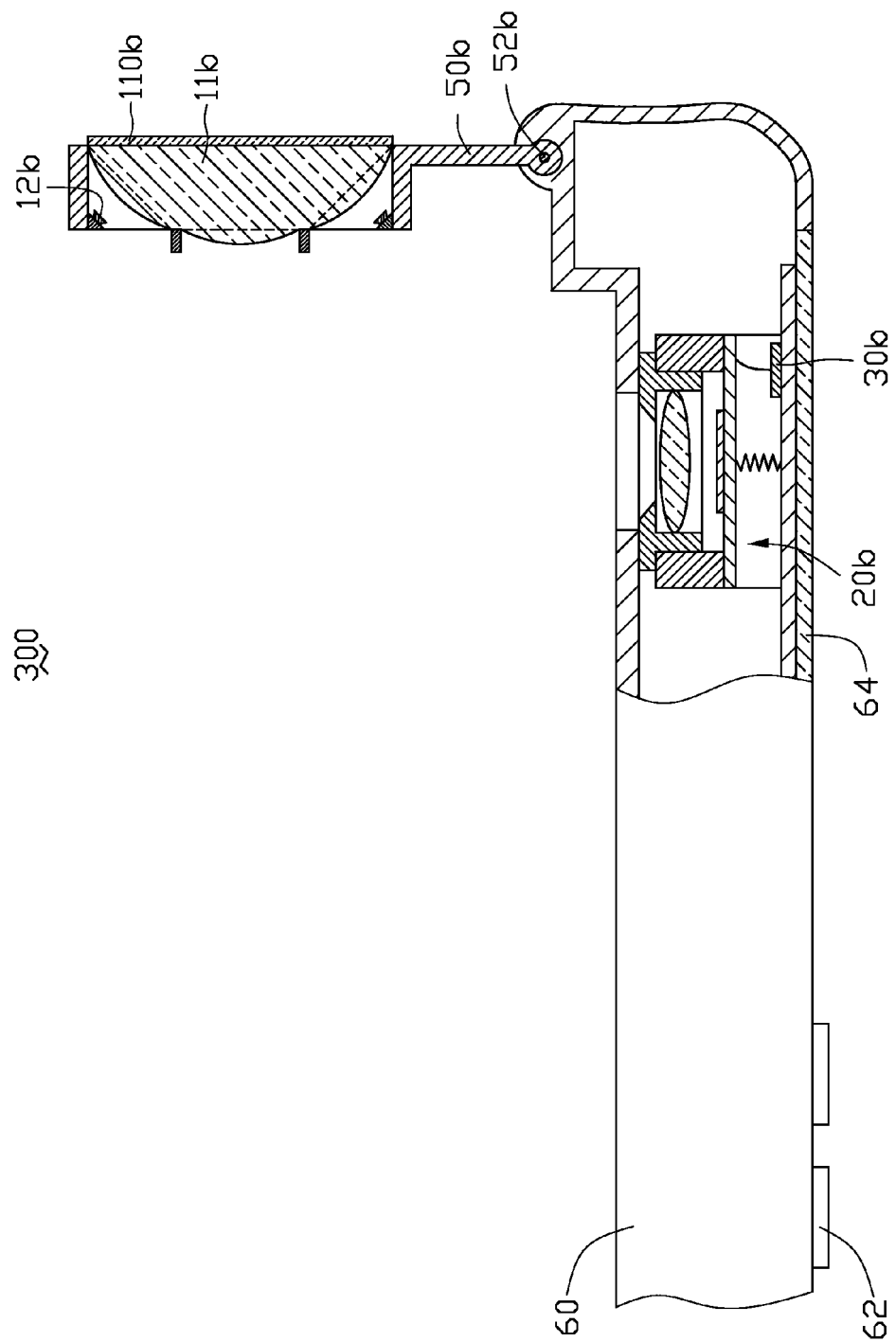
FIG. 6 is a partially cut-away view of the cover at an opening state relative to the main body shown in FIG. 5.

Referring to FIGS. 5 and 6, an exemplary portable electronic device 300 according to a third embodiment is shown. The portable electronic device 300 includes a main body 60 and a cover 50b, the cover 50b is rotatablely mounted on the main body 60 by a shaft 52b. The main body 60 has a front surface and an opposite back surface, and the front surface has a keyboard 62 and a screen 64 thereon. A camera module 20b and a processor 30b are received in the main body 60, and the camera module 20b faces to the back surface of the main body 60. A light guide 11b in a frustum of a quadrangular pyramid shape and four light source 12b are received in the cover 50b. The light guide 11b, the four light source 12b, the camera module 20b and the processor 30b are similar to the light guide 11, the four light source 121, 122, 123, 124, the camera module 20 and the processor 30 illustrated above.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A fingerprint identification apparatus, comprising:
    at least three light sources for emitting light beams;
    a light guide having a top surface, a bottom surface and at least three side surfaces interconnected between the top surface and the bottom surface, the top surface being a fingerprint contacting surface, each of the at least three side surfaces having a first curved portion provided thereon, the bottom surface having a second curved portion provided thereon, each of the first curved portions, on the respective at least three side surfaces, being opposite to the respective at least three light sources and configured for converging the light beams, emitted from the respective at least three light sources, onto the top surface for illuminating a fingerprint on the top surface;
    a camera module, in alignment with the second curved portion on the bottom surface of the light guide, configured for capturing and converting an optical image of the fingerprint into an electronic image associated with the fingerprint; and
    a processor for receiving and comparing the electronic image associated with the fingerprint with pre-stored electronic images of fingerprints to verify the fingerprint.

2. The fingerprint identification apparatus as described in claim 1, further comprising a main body and a cover rotatable relative to the main body, the at least three light sources and the light guide being received in the cover, the camera module and the processor being received in the main body.

3. The fingerprint identification apparatus as described in claim 1, wherein the at least three light sources comprise a red light source, a green light source and a blue light source.

4. The fingerprint identification apparatus as described in claim 1, wherein the light guide is in a frustum of a quadrangular pyramid shape and has four side surfaces, the top surface thereof is larger than the bottom surface thereof, the at least three light sources comprise four light sources.

5. The fingerprint identification apparatus as described in claim 1, wherein the light guide is in a frustum of a triangular pyramid shape and has three side surfaces, the top surface thereof is larger than the bottom surface thereof, the at least three light sources comprise three light sources.

6. The fingerprint identification apparatus as described in claim 1, wherein each of the first curved portions on the side surfaces of the light guide has an aspherical surface opposite to the respective light sources.

7. The fingerprint identification apparatus as described in claim 1, wherein the second curved portion on the bottom surface of the light guide has an aspherical surface opposite to the camera module.

8. The fingerprint identification apparatus as described in claim 1, wherein the top surface of the light guide has a transparent anti fingerprint coating thereon.

9. A portable electronic device, comprising:
    a main body having a front surface and an opposite back surface, the front surface of the main body having a keyboard and a screen provided thereon; and
    a cover rotatable relative to the main body, the cover being arranged on the back surface of the main body, wherein the cover comprising:
    at least three light sources for emitting light beams; and
    a light guide having a top surface, a bottom surface and at least three side surfaces interconnected between the top surface and the bottom surface, the top surface being a fingerprint contacting surface, each of the at least three side surfaces having a first curved portion provided thereon, the bottom surface having a second curved portion provided thereon, each of the first curved portions, on the respective at least three side surfaces, being opposite to the respective at least three light sources and configured for converging the light beams emitted from the respective at least three light sources onto the top surface for illuminating a fingerprint placed on the top surface; and the main body comprising:

a camera module facing to the back surface thereof, the camera module, in alignment with the second curved portion on the bottom surface of the light guide, configured for capturing and converting an optical image of the fingerprint into an electronic image associated with the fingerprint; and a processor for receiving and comparing the electronic image associated with the fingerprint with pre-stored electronic images of fingerprints to verify the fingerprint.

10. The portable electronic device as described in claim 9, wherein the portable electronic device is a mobile communication device.

11. The portable electronic device as described in claim 9, wherein the at least three light sources comprise a red light source, a green light source and a blue light source.

* * * * *